United States Patent
Kadono

(10) Patent No.: US 8,680,876 B2
(45) Date of Patent: Mar. 25, 2014

(54) DYNAMIC QUANTITY DETECTING MEMBER AND DYNAMIC QUANTITY DETECTING APPARATUS

(75) Inventor: Koji Kadono, Tokyo (JP)

(73) Assignee: Sony Corporation, Tokyo (JP)

( * ) Notice: Subject to any disclaimer, the term of this patent is extended or adjusted under 35 U.S.C. 154(b) by 566 days.

(21) Appl. No.: 12/825,940

(22) Filed: Jun. 29, 2010

(65) Prior Publication Data

US 2011/0006787 A1    Jan. 13, 2011

(30) Foreign Application Priority Data

Jul. 9, 2009 (JP) ................................. P2009-162599

(51) Int. Cl.
G01R 27/26 (2006.01)

(52) U.S. Cl.
USPC ........... 324/663; 324/658; 324/660; 324/661; 324/686; 345/173; 345/174

(58) Field of Classification Search
USPC .................... 324/713, 658–690; 345/173–174
See application file for complete search history.

(56) References Cited

U.S. PATENT DOCUMENTS

| | | | | |
|---|---|---|---|---|
| 5,745,336 A * | 4/1998 | Saito et al. | ................. | 361/321.5 |
| 5,942,733 A * | 8/1999 | Allen et al. | ................. | 178/18.01 |
| 6,234,031 B1 * | 5/2001 | Suga | ........................ | 73/862.474 |
| 6,657,614 B1 * | 12/2003 | Ito et al. | ........................ | 345/168 |
| 6,862,942 B2 * | 3/2005 | Kawahata | ................. | 73/862.046 |
| 7,178,405 B2 * | 2/2007 | Sato | ................................ | 73/818 |
| 2004/0188785 A1 * | 9/2004 | Cunningham et al. | ......... | 257/415 |
| 2006/0138574 A1 * | 6/2006 | Saito et al. | .................... | 257/417 |
| 2008/0238882 A1 * | 10/2008 | Sivarajan et al. | ............. | 345/174 |
| 2009/0003863 A1 * | 1/2009 | Hagiwara et al. | ................ | 399/58 |
| 2009/0015270 A1 * | 1/2009 | Hayakawa et al. | ........... | 324/686 |
| 2009/0151478 A1 * | 6/2009 | Shimomoto et al. | ...... | 73/862.626 |
| 2010/0048250 A1 * | 2/2010 | Jiang et al. | ..................... | 455/566 |
| 2010/0300862 A1 * | 12/2010 | Tamura et al. | ................ | 200/600 |
| 2010/0308844 A1 * | 12/2010 | Day et al. | ....................... | 324/663 |
| 2012/0235935 A1 * | 9/2012 | Ciesla et al. | ................... | 345/173 |

FOREIGN PATENT DOCUMENTS

| | | |
|---|---|---|
| JP | 64-51564 | 3/1989 |
| JP | 2005-3494 | 1/2005 |
| JP | 2005-114122 | 4/2005 |
| JP | 2009-020006 | 1/2009 |

OTHER PUBLICATIONS

Japanese Office Action issued May 28, 2013 in corresponding Japanese Patent Application No. 2009-162599.

* cited by examiner

*Primary Examiner* — Tung X Nguyen
*Assistant Examiner* — Thang Le
(74) *Attorney, Agent, or Firm* — K&L Gates LLP

(57) ABSTRACT

A dynamic quantity detecting member includes: a base substrate of which a part or the whole including a contact portion is deformed in accordance with pressing of a contact object and of which an original shape is recovered when the pressing of the contact object disappears; electrodes serving as displacement electrodes of which the plurality of electrodes are fixed to a surface or inside of the base substrate and of which at least one electrode is disposed in a deformable portion (which is a region deformable and displaceable during the deformation) of the base substrate; and wirings which are connected to the electrodes. During deformation, the displacement electrodes are deformed and displaced with the deformation and displacement of the deformable portion without separation from the base substrate and without damaging conductivity. The deformation and displacement of the deformable portion are detected as a variation in capacitance between the electrodes.

16 Claims, 7 Drawing Sheets

DYNAMIC QUANTITY DETECTING MEMBER AND DYNAMIC QUANTITY DETECTING APPARATUS

CROSS REFERENCES TO RELATED APPLICATIONS

The present application claims priority to Japanese Priority Patent Application JP 2009-162599 filed in the Japan Patent Office on Jul. 9, 2009, the entire content of which is hereby incorporated by reference.

BACKGROUND

The present application relates to a dynamic quantity detecting member detecting a dynamic quantity such as displacement, force, and acceleration in a capacitance manner and a dynamic quantity detecting apparatus suitable for an input apparatus of an electronic apparatus or the like.

In the past, a keyboard and a switch such as a pressing button switch were widely used as a general input apparatus for an electronic apparatus or the like, that is, an input user interface (UI). In general, the operation of the switch including a remote controller and a mouse is an alternative operation of selecting ON or OFF by physical contact. The UI may considerably damage operability and also restrict the design of an electronic apparatus, since the number of buttons or keys increases as an increase in input information and options are increased.

In recent years, by permitting a pointing device such as a mouse, a touch pad, or a touch screen to be compatible with an output UI, a graphical UI (GUI) enabling an intuitive operation has been widely used.

Through clicking of a pressing button switch, a mouse has a distinguishing feature of being comfortable to operate. However, since the mouse has to be moved on an operating surface, the mouse may not be used in an environment where an operating surface is not provided.

Numerous touch sensing devices, such as touch pads or pen tablets, of a resistance film type, a capacitance type, and a surface elastic wave type have been put to practical use. Moreover, the touch sensing devices have been mounted in an automated teller machine (ATM), various portable information terminals, a car navigation system, and the like. In a general touch sensing device, however, at one operating point the choice of only selecting ON or OFF is enabled, and thus it is difficult to perform complex information processing. Therefore, when there is a lot of information to be processed, the touched surface has to be expanded two-dimensionally. For this reason, the operability may deteriorate and, as with switch, the design of an electronic apparatus is also restrained. Moreover, since there is no clicking sense in the touch sensing device, unlike the pressing button switch, an intuitive operation may not be performed and it is easy to feel an operation is awkward. Moreover, it becomes difficult for the visually impaired to perform an operation, or to perform an operation in a dark place without fumbling.

In order to input more various kinds of information in comparison to the alternative operation, a method of detecting input or displacement during input may be taken into consideration. Various input sensors of a resistance wire type, a piezoelectric type, and the like have been put to practical use as an apparatus sensing pressure. A pen inputting apparatus realizing input information control by reflection of pen pressure during input by providing a pressure sensor in a switching device been appeared. In a generally used pressure sensor, however, the input is converted into an electric signal by receiving the pressure of a pressure source via a diaphragm formed by a metal thin plate or a thin plastic film and detecting the pressure applied to the diaphragm or the displacement or deformation of the diaphragm by a converting device. When this happens, the sensing device is designed so that deformation of the diaphragm is minimized so the pressure doesn't vary with the influence of the pressure source and a simple relation, such as a proportional relation, is established between the input and the electric signal. Therefore, the pressure sensor can widely detect the input but has a restriction in that a maximum deformation of about 1 mm can be read. In order to sense the pen pressure, the writing surface receiving the pen pressure has to be sufficiently hard. For this reason, in the input apparatus sensing pen pressure, an operator may write with a hard pen on a hard writing surface, and thus it is difficult for the operator to feel a pleasant, natural feeling or a comfortable operating feeling.

On the other hand, a capacitance type displacement sensor is disclosed as the displacement sensing apparatus in numerous Japanese unexamined patent application publications. The capacitance type displacement sensor is one kind of non-contact type minute displacement sensor applying the principle of a capacitor and is capable of measuring minute displacement with high precision by using a variation in the capacitance in inverse proportion to the distance between electrodes. In order to detect the minute variation in the capacitance with high precision, methods such as frequency modulation, amplitude modulation, and phase modulation may be used and a capacitance displacement sensor can detect displacement of 0.2 mm to 10 mm with a high precision of 1 μm to 10 μm.

As an input apparatus applying a displacement sensor, Japanese Unexamined Patent Application Publication No. 2005-3494 (claim 2, pages 7 to 12, FIGS. 1 to 6), which is described below, discloses a panel sensor which includes a force detecting unit detecting a force applied to a panel and in which the force detecting unit includes a detector detecting a weak force and a detector detecting a strong force.

FIGS. 7A to 7C are partial sectional views illustrating an example of the panel sensor. A panel sensor 100 generally includes a square panel 110, panel holders 120 disposed on the four corners of the square panel 110, and a force detecting unit (force sensor) 130. A force applied to the panel 110 is transferred to the force sensor 130 via the panel holders 120. FIG. 7 shows the vicinity of one corner (angled portion) of the panel sensor 100.

The force sensor 130 includes a diaphragm 131, an electrode 132, a substrate 133, an inner casing 134, a crossbeam 135, a fixed casing 136, an electrode 137, and a holder 138. The diaphragm 131 includes a thin film 131a with elasticity and a holding portion 131b holding the thin film 131a in a state where a tensile force is maintained. The diaphragm 131 is fixed along with the electrode 132 to the substrate 133. A displacement electrode (not shown) is disposed in the thin film 131a. The displacement electrode and the electrode 132 form a first capacitor. The substrate 133 is disposed on the holder 138 via the inner casing 134, the crossbeam 135, and the fixed casing 136. The crossbeam 135 is formed of a material with a predetermined elasticity. The electrode 132 and the electrode 137 on the holder 138 form a second capacitor.

When a small force is applied in a direction of pressing the panel 110, as shown in FIG. 7B, the thin film 131a is expanded and deformed and thus the displacement electrode on the thin film 131a is displaced. This displacement is detected as a variation in the capacitance of the first capacitor.

When the force applied to the panel 110 becomes stronger, the distance between the thin film 131a and the electrode 132 becomes narrower and thus the capacitance of the first capacitor becomes larger.

When the force applied to the panel 110 further becomes stronger, as shown in FIG. 7C, the thin film 131a and the electrode 132 are attached to each other. Therefore, the capacitance of the first capacitor is rarely varied. In this case, since the crossbeam 135 is curved, the substrate 133 to which the electrode 132 is fixed is displaced downwardly in the drawing. This displacement is detected as a variation in the capacitance of the second capacitor.

SUMMARY

In the input apparatus in which the pressure sensor senses the pen pressure during input, as described above, the input is performed on a hard writing surface with a hard pen. Therefore, it is difficult for an operator to feel a pleasant, natural feeling or a comfortable operating feeling.

In the input apparatus in which the displacement sensor senses the displacement caused during input, the input is generally received by the diaphragm and the displacement of the diaphragm is detected in a capacitance manner. The displacement sensor according to a related example is designed so that a relatively hard material is used as the material of the diaphragm to decrease the degree of deformation of the diaphragm in that a simple relationship such as linearity has to be established between the input strength and the degree of deformation of the diaphragm. In the input apparatus using this displacement sensor, it is difficult for an operator to feel a pleasant, natural feeling or a comfortable operating feeling, as in the input apparatus sensing the pen pressure.

In order to receive the input of a large range, an elastic member (the crossbeam 135 in Japanese Unexamined Patent Application Publication No. 2005-3494 (claim 2, pages 7 to 12, FIGS. 1 to 6)) holding the diaphragm has to be deformed since the degree of deformation of the diaphragm is restrained small. For this reason, the configuration of the input apparatus becomes complex and larger in size. Therefore, the operability may deteriorate.

It is desirable to provide a dynamic quantity detecting member which is capable of inputting more various kinds of information in comparison to an alternative operation and is capable of providing a pleasant, natural feeling or a comfortable operating feeling, which has a small, simple configuration, which is rarely restrained in operation by the usage environment, and which is appropriate as an input apparatus of an electronic apparatus. Moreover, it is desirable to provide a dynamic quantity detecting member included in the dynamic quantity detecting apparatus.

According to an embodiment, there is provided a dynamic quantity detecting member including: a base substrate of which a part or the whole including a contact portion is deformed in accordance with pressing of a contact object and of which an original shape is recovered when the pressing of the contact object disappears; electrodes serving as displacement electrodes of which the plurality of electrodes are fixed to a surface or inside of the base substrate and of which at least one electrode is disposed in a deformable portion (which is a region deformable and displaceable during the deformation) of the base substrate; and wirings which are connected to the electrodes. During the deformation, the displacement electrodes are deformed and displaced with the deformation and displacement of the deformable portion without separation from the base substrate and without damaging conductivity. The deformation and the displacement of the deformable portion are detected as a variation in capacitance between the electrodes.

According to an embodiment, there is provided a dynamic quantity detecting apparatus including: the dynamic quantity detecting member; and a detecting circuit unit which is electrically connected to the electrode via the wiring and detects, as an electric signal, a variation in the capacitance between the electrodes caused by the pressing of the contact object.

In the dynamic quantity detecting member according to the embodiment, the displacement electrode fixed to the deformable portion is deformed and displaced with the deformation and displacement of the deformable portion without separation from the base substrate, when the shape of the deformable portion is varied in accordance with the pressing of the contact object. During the deformation, the capacitance between the displacement electrode and another electrode is varied in accordance with the displacement degree, since the conductivity of the displacement electrode is not damaged. For example, the variation in the capacitance is converted into an electric signal by a capacitance detecting circuit connected via the wiring. As a consequence, the degree of the deformation and displacement of the deformable portion of the base substrate or the strength of the pressing causing the deformation and the displacement is converted into the electric signal for detection. When the pressing of the contact object disappears, the original shape of the base substrate is recovered and the displacement electrode is returned to the original position. Therefore, the capacitance between the displacement electrodes returns to the original amount.

At this time, a difference (which is an analog quantity) in the pressing of the contact object can be distinguished as information. Since a finger as the contact object applies a press while feeling the repulsive force of the base substrate gradually increased in accordance with the pressing quantity, the finger can feel a pleasant, natural feeling or a comfortable operating feeling. Moreover, the dynamic quantity detecting member is small and simple, and can obtain the degree of freedom of the large shape. Since a separate operating surface is not necessary, the operation is rarely restrained by the usage environment.

The dynamic quantity detecting apparatus according to the embodiment can obtain the above-described advantages, since the dynamic quantity detecting apparatus includes the dynamic quantity detecting member according to the embodiment. As a consequence, it is possible to realize an input apparatus of an electronic apparatus which is capable of inputting more various kinds of information in accordance with the difference (which is an analog quantity) in the pressing of the contact object in comparison to an alternative operation and is capable of obtaining a pleasant, natural feeling or a comfortable operating feeling, which has a small, simple configuration, which is rarely restrained in an operation by the usage environment.

Additional features and advantages are described herein, and will be apparent from the following Detailed Description and the figures.

DETAILED DESCRIPTION

In a dynamic quantity detecting member according to an embodiment, the plurality of electrodes partitioned so as to divide positions of the base substrate may each be disposed along with the wiring independent from the electrode. A difference in the position at which the contact object presses the base substrate may be distinguished by using the division as a unit.

At least one of the electrodes may be disposed at a position facing the displacement electrode.

Two to ten pairs of the displacement electrodes and the electrode facing the displacement electrodes may be connected to each other in series.

A material of the displacement electrode may be a carbon nanotube or a conductive polymer.

A ratio of expansion and contraction of the displacement electrode caused by the pressing of the contact object may be 200% or more.

A degree of variation in the distance between the electrodes caused by the pressing of the contact object may be 1 mm or more.

A material of the base substrate may be an elastomer (a polymer material with elasticity. In particular, the material of the base substrate may be a porous elastomer. In this case, a material of the base substrate may be a material of which a constant of spring is 0.1 N/mm or less. A carbon nanotube may be added with a mass ratio of 0.05 or less to the base substrate.

The dynamic quantity detecting member may have a shape to be gripped in one hand for operation.

The base substrate has a structure in which an airtight container formed of a flexible material is filled with a gas, a liquid, or a gel-like solid.

A relative transitivity of the base substrate occupying the space between the electrodes may be 1.1 or more.

According to an embodiment, when a dynamic quantity detecting apparatus is used along with another electronic apparatus, the dynamic quantity detecting apparatus is configured as an input apparatus outputting an electric signal corresponding to a strength of the pressing of the contact object to the another electronic apparatus.

Next, preferred embodiments will be described in detail with reference to the drawings.

Embodiment 1

Figure 1A:
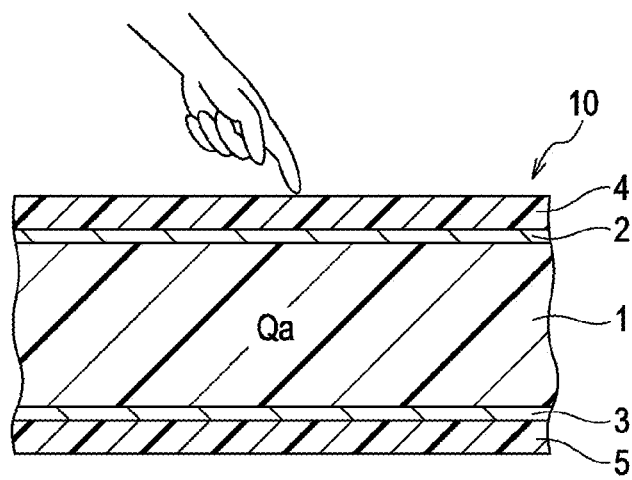
FIGS. 1A and 1B are sectional views illustrating the configuration of a dynamic quantity detecting member as a flat input member according to Embodiment 1.
Figure 1B:
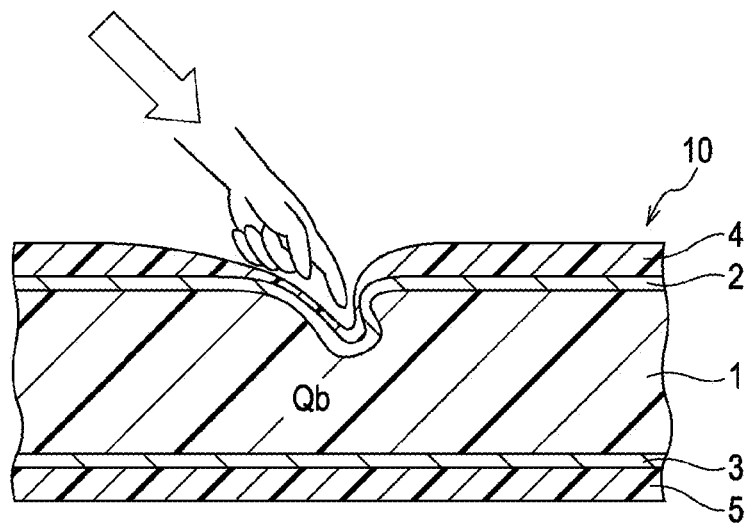

FIGS. 1A and 1B are sectional views illustrating the configuration of a dynamic quantity detecting member 10 formed as a flat input member according to Embodiment 1. The dynamic quantity detecting member 10 includes a base substrate 1, a displacement electrode 2, an electrode 3 facing the displacement electrode 2, and electrode holders 4 and 5 protecting the displacement electrode 2 and the electrode 3, respectively.

The base substrate 1 is formed of an elastomer (a polymer material with elasticity). A part or the whole of the base substrate 1 including a contact portion is deformed in accordance with the pressing strength of a contact object. However, when the pressing of the contact object disappears, the original shape of the base substrate 1 is recovered. The displacement electrode 2 is formed of a carbon nanotube layer, for example. The displacement electrode 2 is fixed to a deformable portion (which is a region deformed and displaced when the base substrate 1 is deformed) of the base substrate 1. The carbon nanotube layer is strong and thin, and thus is deformed and displaced with the deformation and displacement of the deformable portion without separation from the base substrate 1 and damaging conductivity, when the base substrate 1 is deformed. The position at which the electrode 3 is disposed is not particularly limited. It is preferable that the electrode 3 is formed so as to face the deformation electrode 2 since capacitance is efficiently formed between the displacement electrode 2 and the electrode 3. In FIGS. 1A and 1B, one electrode 3 facing the displacement electrode 2 is illustrated, but a plurality of electrodes may be disposed so as to face the displacement electrode 2.

The electrode holders 4 and 5 are disposed to form or protect the displacement electrode 2 and the electrode 3, respectively. However, functionally, the electrode holders 4 and 5 are considered as a part of the base substrate. Therefore, the electrode holders 4 and 5 may be formed of the same elastomer as that of the base substrate 1. Parts or the wholes of the electrode holders 4 and 5 including contact portions are deformed in accordance with the strength of the pressing of the contact object, but the original shapes of the electrode holders 4 and 5 are recovered, when the pressing of the contact object disappears.

As shown in FIGS. 1A and 1B, the displacement electrode 2 fixed to the deformable portion is displaced, when the shape of the base substrate 1 is deformed in accordance with the processing of the contact object. Therefore, the capacitance between the displacement electrode 2 and the electrode 3 is varied from Qa to Qb in accordance with the degree of the displacement. The variation in the capacitance is converted into an electric signal by a capacitance detecting circuit connected via a wiring (not shown). As a consequence, the degree of the deformation and displacement of the deformable portion of the base substrate 1 or the strength of the pressing causing the deformation and the displacement is converted into the electric signal for detection. When the pressing of the contact object disappears, the original shape of the base substrate 1 is recovered and the displacement electrode 2 is returned to the original position. Therefore, the capacitance between the displacement electrode 2 and the electrode 3 is recovered to the original amount.

Since a difference in the pressing quantity (analog quantity) of the contact object is distinguished as information, a dynamic quantity detecting apparatus using the dynamic quantity detecting member 10 as an input unit can realize an input apparatus capable of inputting various kinds of information in comparison to an alternative operation. Since a finger applies a press while feeling the repulsive force of the base substrate 1 gradually increased in accordance with the pressing quantity, the finger can feel a pleasant, natural feeling or a comfortable operating feeling. Accordingly, it is possible to realize the input apparatus capable of executing an intuitively comfortable sense.

When the dynamic quantity detecting member 10 is applied to the input apparatus of an electronic apparatus or the like, the pressing quantity is rarely used as input information without change even in a case where the pressing quantity of a contact object is even a continuous analog quantity. For example, when a finger is used as the contact object, a difference in the pressing quantity can be easily distinguished and detected with two to five stages from the strength of the repulsive force received from the electrode holder 4 and the base substrate 1 corresponding to the base substrate. In this case, each of two to five stages of the pressing quantity distinguished clearly is used as one kind of input information. When the pressing quantity is detected as a continuous analog quantity, the pressing quantity is not necessary to have precise accuracy such as in setting of a scroll speed.

The feature of the embodiment is to preferably use the large deformation of the base substrate (the base substrate 1 and the electrode holder 4 in the dynamic quantity detecting member 10). In a displacement sensor used in general physical measurement, as described above, a relatively hard material is used as the material of a diaphragm to decrease the degree of deformation of the diaphragm in that a simple relationship such as linearity has to be established between the input strength and the degree of deformation of the diaphragm and precise reproduction has to be obtained. When this displacement sensor is applied to the input apparatus, it is difficult to feel a more pleasant, natural feeling or comfortable operating feeling. In the displacement sensor applied to the input apparatus, as described above, it is not necessary to realize the precise linearity and reproduction between input and output operations in an analog manner. Therefore, the base substrate is allowed to be deformed over the range in which the precise linearity or reproduction is realized. Moreover, by preferably utilizing the large deformation of the base substrate, it is possible to obtain the sacrificed pleasant, natural feeling or comfortable operating feeling.

The dynamic quantity detecting member 10 is small and simple, and can obtain the degree of freedom of the large shape. Since a separate operating surface is not necessary, the operation is rarely restrained by the usage environment, unlike a mouse.

In this way, by utilizing the dynamic quantity detecting member 10, it is possible to realize the input of various kinds of information in comparison to existing examples and to obtain a more pleasant, natural feeling or comfortable operating feeling. Moreover, it is possible to realize the input apparatus of an electronic apparatus or the like in that the input apparatus is small and simple and the operation is rarely restrained due to the usage environment.

In the dynamic quantity detecting member 10, the directly detected dynamic quantity is the displacement degree of the displacement electrode 2, but the pressing strength of a contact object causing the displacement is indirectly detected. When a weight with a certain mass is disposed as a contact object, any acceleration applied to the weight can be converted to a press. Therefore, acceleration can be detected as a dynamic quantity.

For example, when the base substrate 1 is a laminated member, it is preferable that two to ten pairs of displacement electrode 2 and electrode 3 facing the displacement electrode 2 are disposed in series so as to be buried in the base substrate 1. Accordingly, since the distance between the electrodes of each capacitor is reduced and the capacitor is increased, a variation in the capacitor is easily detected.

The material of the displacement electrode 2 may be a carbon nanotube or a conductive polymer. As for these materials, elasticity is excellent and the conductive characteristic is maintained upon expansion and contraction. A hard material, such as metal, used as an electrode material of a displacement sensor according to existing examples may not satisfy the necessary characteristics of the displacement electrode 2 of the dynamic quantity detecting member 10. One of reasons for realizing the dynamic quantity detecting member 10 is that the carbon nanotube or the like can be used as a new electrode material capable of maintaining the conductivity in a state where the electrode material is stretched even upon expansion and contraction of 120% or more.

It is preferable that a ratio of expansion and contraction of the displacement electrode 2 caused by the pressing of a contact object is 200% or more. For example, in order to reliably realize the pressing degree (the degree of deformation of the displacement electrode 2) of the same degree or more of the width of the deformable portion irrespective of the deformed shape, the ratio of expansion and contraction has to be about 200% or more.

It is preferable that the degree of variation in the distance between the electrodes caused by the pressing of the contact object is 1 mm or more. In particular, by using the carbon nanotube layer as the material of the displacement electrode 2, it is possible to realize deformation of 1 cm or more, which may not be realized by a diaphragm method or a spacer method. Accordingly, it is preferable to use the carbon nanotube layer as the material of the displacement electrode 2.

It is preferable that the material of the base substrate 1 and the electrode holders 4 and 5 is an elastomer (a polymer material with elasticity). Examples of the material include acrylic rubber, acrylonitrilebutadiene rubber, isoprene rubber, urethane rubber, ethylene-propylene rubber, epichlorohydrin rubber, styrene-butadiene rubber, silicone rubber, and polyurethane rubber. In particular, it is preferable that the material is a porous elastomer such as biosponge, porous polymer, form-molded rubber, or polyurethane sponge. The elastomer is preferable as an elastic member in that its tensile expansion ratio is a very large 200% or more and its tensile strength and contraction ratio are excellent. The porous elastomer is a material with a stable shape in a state where numerous air gaps are formed and which can considerably reduce in volume by reducing the volumes of the air gaps when an outside pressure is applied. Therefore, the porous elastomer is an optimum material of the base substrate 1 and the electrode holders 4 and 5 of the dynamic quantity detecting member 10.

It is preferable that the material of the base substrate 1 and the electrode holders 4 and 5 is a material of a constant of spring is 0.1 N/mm or less. The force applied upon operating the dynamic quantity detecting member 10 becomes smaller, as the constant of spring of the material is smaller. For example, when the dynamic quantity detecting member is operated with the tip of a person's finger, the maximum force of the tip of the finger is about 1 N, and the constant of spring of a pressing portion is 0.1 N/mm or less, large displacement of 1 mm or more can be obtained with a weak force of the tip of the finger.

It is better that the carbon nanotube with a mass ratio of 0.05 or less is added to the base substrate 1 and the electrode holders 4 and 5. Approximately, when the added amount of carbon nanotube is a mass ratio of 0.05 or less, conductive pass does not occur due to the contact between the carbon nanotubes. By adding the carbon nanotube within this range, it is possible to improve permittivity of the base substrate 1 and the electrode holders 4 and 5 thanks to accumulation of local polarization effect of the carbon nanotube.

The relative permittivity of the base substrate 1 is not particularly limited. As in Embodiment 4 which is described below, when a base substrate 41 occupying the space between a displacement electrode 42 and an electrode 43 facing the displacement electrode 42 is a gas, the relative permittivity of the base substrate 41 is nearly 1. However, in order to increase the detection sensitivity of the dynamic quantity detecting member 10, it is preferable that the capacitance between the displacement electrode 2 and the electrode 3 is large. Therefore, it is preferable that the relative permittivity of the base substrate 1 is large. It is preferable that the relative permittivity of the base substrate 1 is 1.1 or more and the capacitance easily detected is ensured. For example, when the displacement electrode 2 and the electrode 3 have a circular shape with a 12 mm diameter, the distance between the electrodes is 10 mm, and the relative permittivity of the base substrate 1 is 1.1, the capacitance is 0.11 pF. This value is substantially the same as that of the capacitance easily read by the capacitance detecting circuit.

The dynamic quantity detecting apparatus according to this embodiment includes the dynamic quantity detecting member 10 and a detecting circuit unit which is electrically connected to the displacement electrode 2 and the electrode 3 via wirings (not shown) and detects, as an electric signal, a variation in the capacitance between the electrodes caused by the pressing of a contact object. The dynamic quantity detecting apparatus is preferably configured as an input apparatus which is used together with another electronic apparatus and outputs the electric signal generated in accordance with the strength of the pressing of a contact object to another electronic apparatus.

Figure 2:
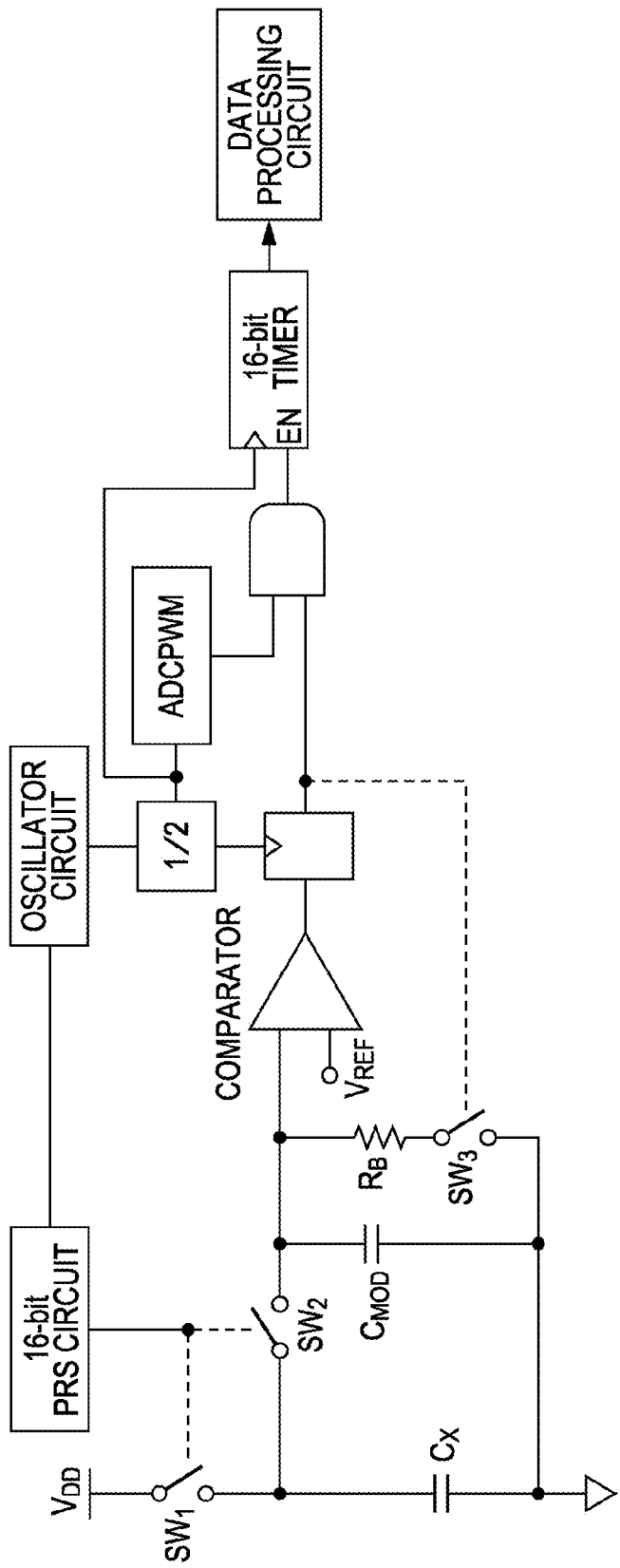
FIG. 2 is an explanatory diagram (block diagram) illustrating an example of a capacitance detecting circuit.

An available general capacitance measuring device may be used as the detecting circuit unit detecting the variation in the capacitance. FIG. 2 is an explanatory diagram (block diagram) illustrating an example of the capacitance detecting apparatus. In the capacitance detecting apparatus, the size of unknown capacitance $C_X$ is determined on the basis of a reference capacitance $C_{MOD}$. That is, in a state where $V_{DD}$ is maintained with a certain voltage, SW1 and SW2 are alternatively closed and opened by an oscillator circuit and a 16-bit PRS (Pseudo Random Sequence) circuit. When the unknown capacitance $C_x$ is charged in the voltage $V_{DD}$ during an ON state of the SW1 and SW2 is turned on, some of the charges charged in the unknown capacitance $C_x$ are transferred to the reference capacitance $C_{MOD}$ and thus the unknown capacitance $C_x$ and the reference capacitance $C_{MOD}$ become the same voltage. Whenever the SW1 and SW2 are opened and closed, this operation is repeated and thus the voltage of the reference capacitance $C_{MOD}$ is gradually increased. When the voltage of the reference capacitance $C_{MOD}$ is higher than a reference voltage $V_{REF}$, a comparator detects this state. Therefore, the number of opening and closing operations repeated until this time is sent to a data processing circuit. In the data processing circuit, the size of the unknown capacitance $C_X$ is determined on the basis of the number of opening and closing operations. SW3 is turned on for a short time by output of the comparator and thus the charges accumulated in the reference capacitance $C_{MOD}$ are discharged. Then, the reference capacitance $C_{MOD}$ is refreshed. By repeating the above operations, the size of the unknown capacitance $C_X$ is measured intermittently.

Embodiment 2

An example of a dynamic quantity detecting member according to Embodiment 2 of claim 2 will mainly be described.

Figure 3A:
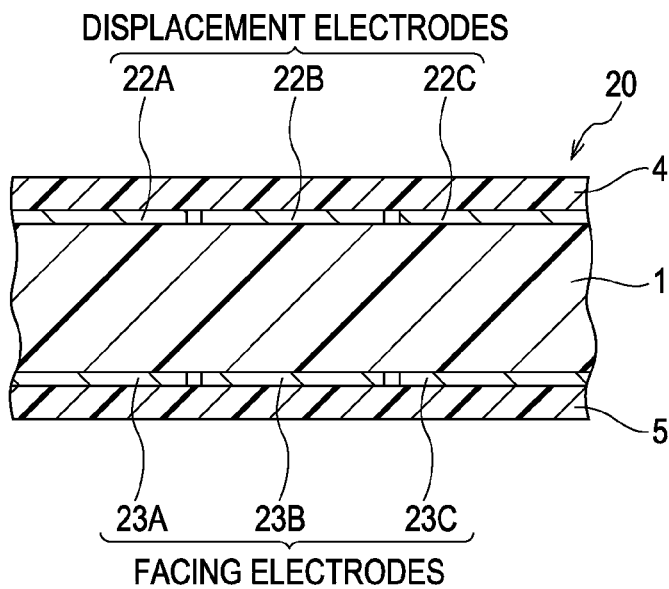
FIGS. 3A and 3B are sectional views illustrating the configuration of a dynamic quantity detecting member as a flat input member according to Embodiment 2.
Figure 3B:
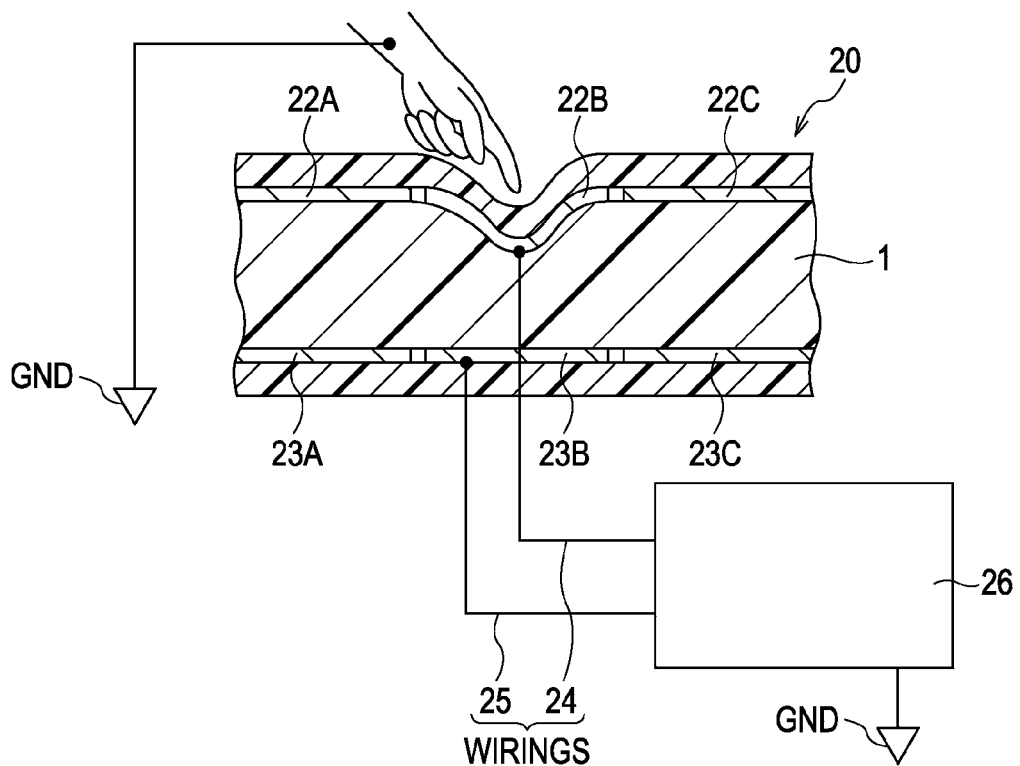

FIGS. 3A and 3B are sectional views illustrating the configuration of a dynamic quantity detecting member 20 configured as a flat input member according to Embodiment 2. The dynamic quantity detecting member 20 includes the base substrate 1, displacement electrodes 22A to 22C, electrodes 23A to 23C facing the displacement electrodes 22A to 22C, respectively, and electrode holders 4 and 5 used to form the displacement electrodes 22 and the electrodes 23, respectively.

The dynamic quantity detecting member 20 is different from the dynamic quantity detecting member 10 according to Embodiment 1 in that the position of the pressing of a contact object is different on the base substrate 1. That is, the plurality of displacement electrodes 22A to 22C partitioned to divide the positions of the base substrate 1 is disposed together with wirings (not shown) independent from the electrodes 23A to 23C facing the displacement electrodes 22A to 22C. Therefore, a difference in the position of the pressing can be distinguished by using the division as a unit.

The displacement electrodes 22A to 22C and the electrodes 23A to 23C are repeatedly selected in time-division by an electrode changing circuit. That is, the pair of displacement electrode 22A and electrode 23A, the pair of displacement electrode 22B and electrode 23B, and the pair of displacement electrode 22C and electrode 23C are sequentially switched in one cycle, connected to the capacitance detecting circuit, and repeated in a short period of the cycle at high speed.

For example, as shown in FIG. 3B, when a contact object presses the surface of the base substrate 1 at the position at which the displacement electrode 22B is disposed, the displacement electrode 22B is deformed and displaced. Then, the capacitance is varied between the displacement electrode 22B and the electrode 23B facing the displacement electrode 22B. Since the variation in the capacitance can be transmitted to a capacitance variation detecting circuit 26 via wirings 24 and 25, the variation in the capacitance is converted into electric signals for detection.

As described in Example 2, the carbon nanotube layer forming the displacement electrodes 22A to 22C of the dynamic quantity detecting member 20 can be patterned by removing any unnecessary portion by etching after the formation of the carbon nanotube layer or by masking a part of the surface of the electrode holder 4 before the formation of the carbon nanotube layer. Alternatively, a printing method may be used. The etching may be performed by mechanical cutting or laser etching, for example.

The dynamic quantity detecting apparatus including the dynamic quantity detecting member 20 is configured to output different instructions to an electronic apparatus in accordance with difference in the difference in the position of the pressing. For example, a decision or a feeling is expressed by pressing the displacement electrode 22A, dragging is indicated by pressing the displacement electrode 22B from front to back and from right to left, and a plurality of items is selected by pressing the displacement electrode 22C.

Embodiment 3

An example of a dynamic quantity detecting member according to Embodiment 3 of claim 12 will mainly be described.

Figure 4:
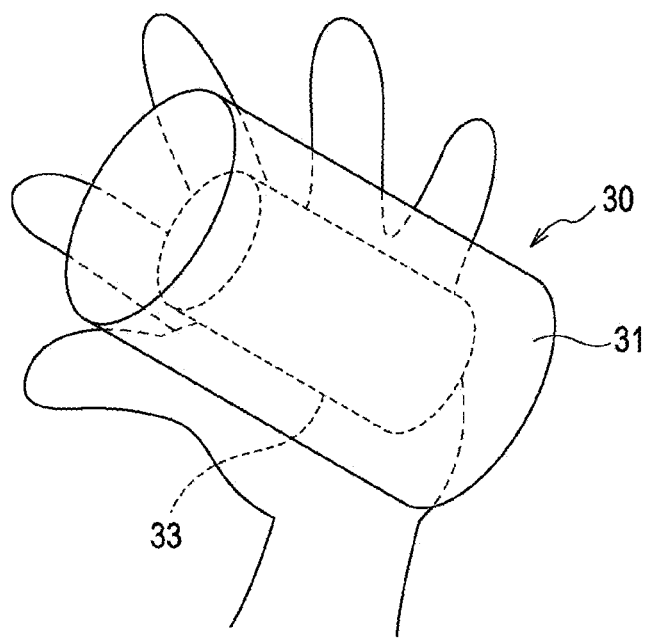
FIG. 4 is a perspective view illustrating the configuration of a dynamic quantity detecting member as a cylindrical input member according to Embodiment 3.

FIG. 4 is a perspective view illustrating the configuration of a dynamic quantity detecting member 30 as a cylindrical input member according to Embodiment 3. The dynamic quantity detecting member 30 may be used as a handheld input member gripped with one hand for operation.

In the dynamic quantity detecting member 30, since a single electrode or the plurality of displacement electrodes is disposed on the outer cylindrically circumferential surface (not shown) of a cylindrical base substrate 31, electrodes 33 are disposed inside the cylindrical base substrate 31 so as to face the displacement electrodes.

A dynamic quantity detecting apparatus including the dynamic quantity detecting member 30 is configured to output different instructions to an electronic apparatus in accordance with difference in the gripped position. For example, a decision or a feeling is expressed by pressing a thumb, drag is indicated by pressing the an index finger from front to back and from right to left, and a plurality of items is selected by pressing a middle finger. For example, the scrolling speed can be varied in accordance with the strength and weakness of grasp of the fingers.

In the dynamic quantity detecting member 30, the pleasant, natural feeling can be obtained with the sense of touch of the cylindrical base substrate 31. Therefore, more numerous kinds of information can be input in comparison to the alternative operation. In addition, the same function as that of a mouse and the comfortable operating feeling can be obtained. Since the dynamic quantity detecting apparatus can be gripped with one hand for operation, the operation is barely restrained due to the usage environment, unlike a mouse which can be moved on an operation surface.

Embodiment 4

An example of a dynamic quantity detecting member according to Embodiment 4 of claim 13 will mainly be described.

Figure 5A:
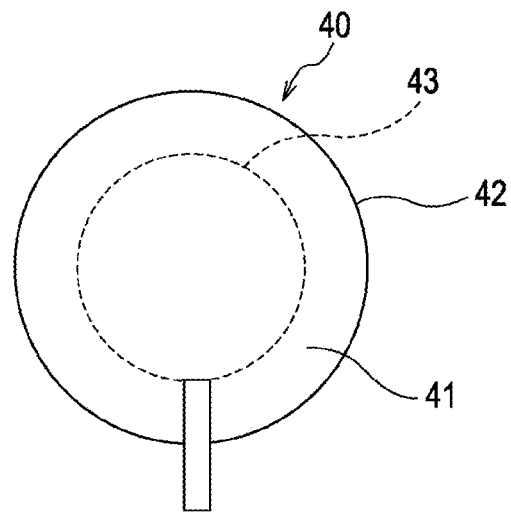
FIGS. 5A and 5B are explanatory diagram illustrating the configuration of a dynamic quantity detecting member as a spherical input member according to Embodiment 4.
Figure 5B:
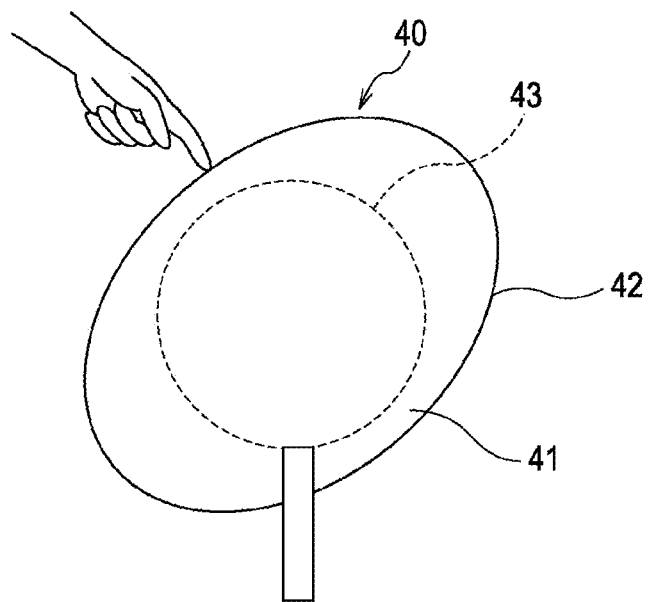

FIGS. 5A and 5B are explanatory diagram illustrating the configuration of a dynamic quantity detecting member 40 as a spherical input member according to Embodiment 4. In the dynamic quantity detecting member 40, a base substrate 41 has a structure in which an airtight container formed of a flexible material is filled with a gas, a liquid, or a gel-like sold. A displacement electrode 42 is disposed on the surface of the base substrate 41 and an electrode 43 is disposed on the surface inside the substrate 41 so as to face the displacement electrode 42.

Since the displacement electrode 42 is displaced with the variation in the shape of the base substrate 41 by the pressing of a contact object, a variation in the capacitance is detected between the displacement electrode 42 and the electrode 43.

EXAMPLES

According to examples, cases will be described in which the dynamic quantity detecting members 10 and 20 described in Embodiments 1 and 2, respectively, are manufactured.

Example 1

In Example 1, the case will be described in which the dynamic quantity detecting member 10 configured as the flat input member described in Embodiment 1 is manufactured.

1. Manufacturing Electrode Holders 4 and 5

First, a base agent of an elastomer (product name: sylgard184 made by DOW CORNING corporation) and a curing agent were mixed at a mass ratio of 15:1. The mixture was put in a mold with a 3-inch diameter and a 1.2 mm depth and was maintained at 85° C. for 100 minutes.

2. Manufacturing Displacement Electrodes 2 and Electrode 3

Next, a carbon nanotube with a 0.4 g/l concentration was added to a 1% by mass aqueous solution of sodium dodecylbenzenesulfonate (SDBS: $C_{12}H_{25}C_6H_4SO_3Na$), a homogenization process was performed with output of 50 W for five minutes using an ultrasonic homogenizer, and then a dispersion liquid was produced. The dispersion liquid of 0.5 ml was disposed in the electrode holders 4 and 5, and a thin coated film was formed on the entire surfaces of the electrode holders 4 and 5 using an application bar with a gap length of a 500 µm. At this time, both electrode holders 4 and 5 may be maintained at a temperature from 30° C. to 70° C. By repeating the above film forming process ten times, the carbon nanotube layer with a surface resistance of 500Ω/ was obtained as the displacement electrode 2 and the electrode 3. The electrode holders 4 and 5 in which the displacement electrode 2 and the electrode 3 are formed, respectively, were cleaned in flowing water for ten minutes.

3. Manufacturing Base Substrate 1

Next, a base agent of an elastomer (product name: sylgard184 made by DOW CORNING corporation) and a curing agent were first mixed at a mass ratio of 15:1. The mixture was put in a mold with a 3-inch diameter and a 25 mm depth and was maintained at 85° C. for 100 minutes to manufacture the base substrate 1.

4. Manufacturing Dynamic Quantity Detecting Member 10

Next, the electrode holders 4 and 5 were disposed so that the displacement electrode 2 and the electrode 3 faced each other with the base substrate 1 interposed therebetween, The base substrate 1, the displacement electrode 2, and the electrode 3 are subjected thermal compression at 80° C. to form a sandwich structure. Subsequently, the wirings are formed in the displacement electrode 2 and the electrode 3 by using a conductive paste having silver as a main material to form the dynamic quantity detecting member 10.

5. Sensing of Squeezing

The wirings of the dynamic quantity detecting member 10 were connected to the capacitance detecting circuit. Available various circuits may be used as the capacitance detecting circuit. By tightly pressing the electrode holder 4 of the dynamic quantity detecting member 10 with a finger and pressing the finger toward the base substrate 1 while increasing the pressure, the variation in the capacitance between the displacement electrode 2 and the electrode 3 was measured.

Figure 6A:
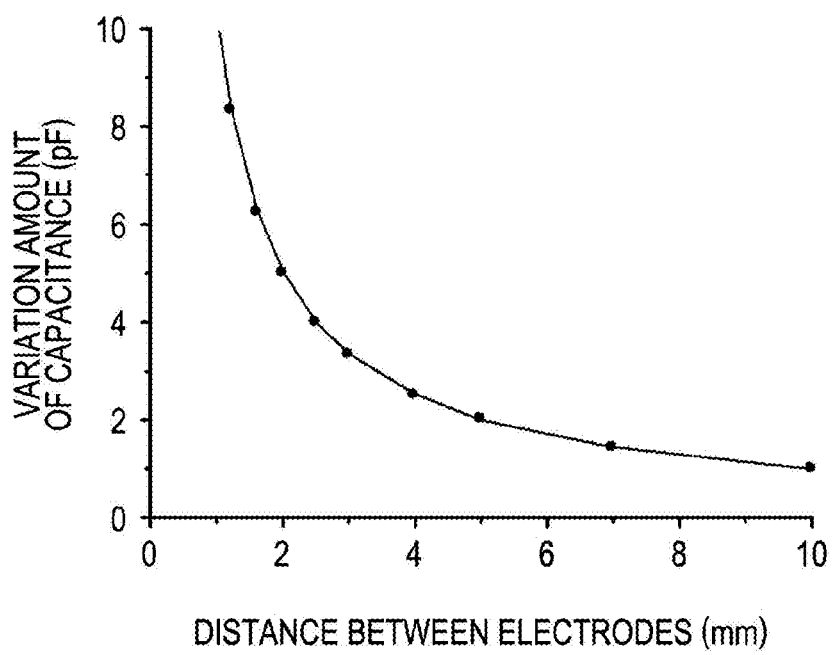
FIG. 6A is a graph illustrating the relationship between electrostatic capacitance and the distance between electrodes in the flat input member according to Example 1 and FIG. 6B is a diagram illustrating an image of the cross-section of the displacement electrode observed by a transmission electron microscopy (TEM) after the displacement electrode is repeatedly displaced.

FIG. 6A is a graph illustrating the relationship between electrostatic capacitance C and a distance d between the electrodes in the dynamic quantity detecting member 10 according to Example 1. Like a general capacitor, capacitance C is varied in inverse proportion to a distance d between the electrodes. Therefore, continuous input is possible in accordance with the displacement of the electrodes.

Figure 6B:
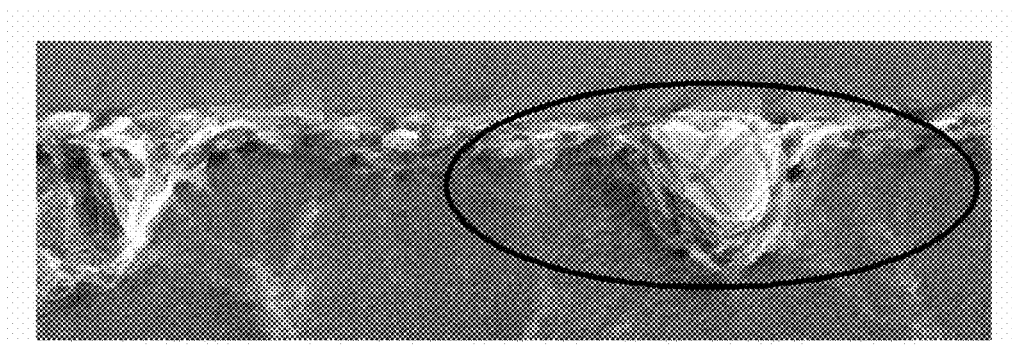
Figure 7A:
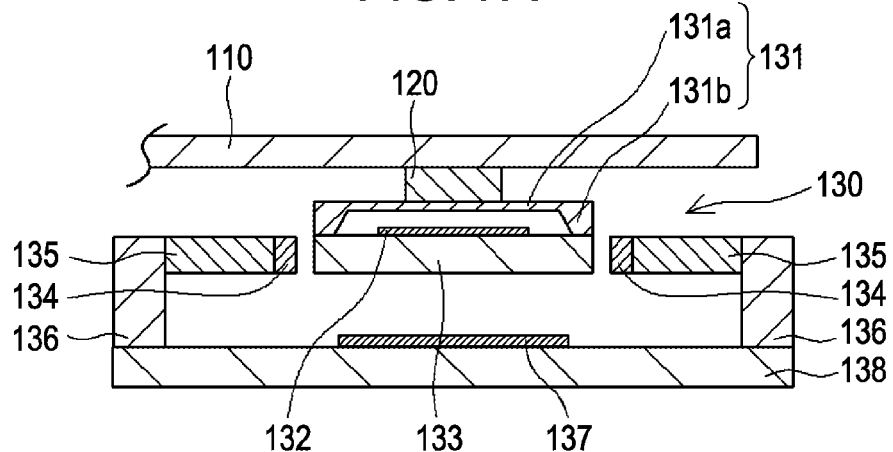
FIGS. 7A to 7C are partial sectional views illustrating an example of a panel sensor disclosed in Japanese Unexamined Patent Application Publication No. 2005-3494 (claim 2, pages 7 to 12, FIGS. 1 to 6).
Figure 7B:
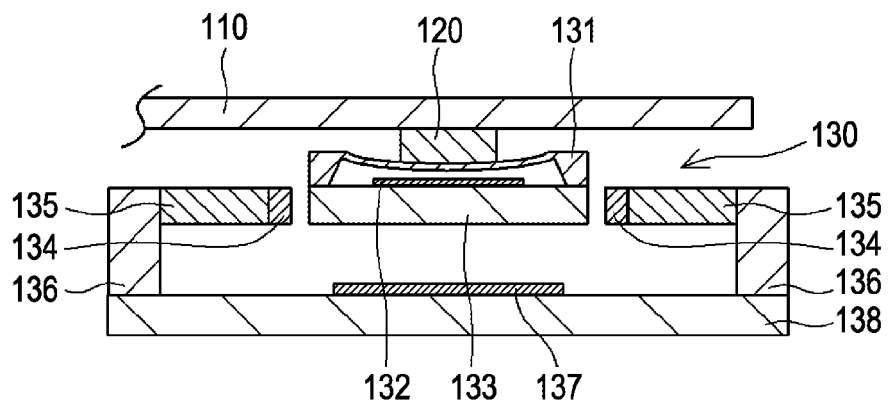
Figure 7C:
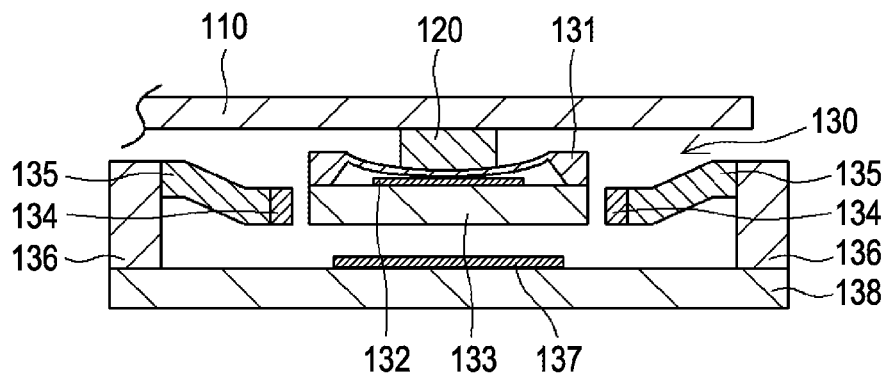

FIG. 6B is a diagram illustrating an image of the cross-section of the displacement electrode 2 observed by a transmission electron microscopy (TEM) after the displacement electrode is repeatedly displaced. Even when the carbon nanotubes are curved, the connection of the carbon nanotubes is maintained. In this way, it can be found that the conductivity is not damaged even when the displacement electrode 2 formed of the carbon nanotube layer is deformed to the degree that the displacement electrode 2 may not be returned to the circular shape.

Example 2

In Example 2, the case will be described in which the dynamic quantity detecting member 20 configured as the handheld flat input member described with reference to FIGS. 3A and 3B in Embodiment 2 is manufactured.

1. Manufacturing Displacement Electrodes 12 and Electrode 13

A carbon nanotube with a 0.5 g/l concentration was added to dimethylformamide, a homogenization process was performed with output of 50 W for five minutes using an ultrasonic homogenizer, and then a dispersion liquid was produced. The produced dispersion liquid was sucked and filtered through a polyethylene terephthalate net (with a hole diameter of 50 μm) to form a carbon nanotube thin film with a surface resistance of 500Ω/. By transferring the carbon nanotube thin film to the upper surface and the lower surface of a polyurethane sponge with a 5 cm length, a 3 cm width, and a 3 cm thickness as the base substrate 1, the displacement electrode 22 and the electrode 23 facing the displacement electrode 22 were formed.

2. Patterning Electrodes

By emitting an $YVO_4$ semiconductor laser beam (with 1064 nm) to selectively remove the carbon nanotube layers by etching, the patterns of the displacement electrodes 22A to 22E and the electrodes 23A to 23E were manufactured to form an electrode structure with five domains (where the displacement electrodes 22D and 22E and the electrodes 23D and 23E are not illustrated in FIGS. 3A and 3B). The laser marker MD-V9900 (an average optical output of 13 W) made by Keyence Corporation was used as an $YVO_4$ semiconductor laser source apparatus. In this apparatus is capable of condensing the laser beams into a spot size of an about 10 μm diameter.

3. Sensing of Squeezing

The wirings of the dynamic quantity detecting member 20 were each connected to the capacitance detecting circuit corresponding to each electrode structure. By gripping the five domains with five fingers to correspond to the fingers, respectively, the displacement occurs in the sponge as the base substrate 1. By tightly pressing the displacement electrodes 22A to 22E of the dynamic quantity detecting member 20 with the fingers and pressing the fingers toward the base substrate 1 while increasing the pressure, the variation in the capacitance between the displacement electrodes 22 and the electrodes 23 was measured.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A dynamic quantity detecting member comprising:
   a base substrate of which a part or the whole including a contact portion is deformed in accordance with pressing of a contact object and of which an original shape is recovered when the pressing of the contact object disappears;
   electrodes serving as displacement electrodes of which the plurality of electrodes are fixed to a surface or inside of the base substrate and of which at least one electrode is disposed in a deformable portion which is a region deformable and displaceable during the deformation of the base substrate; and
   wirings which are connected to the electrodes,
   wherein during the deformation, the displacement electrodes are deformed and displaced with the deformation and displacement of the deformable portion without separating from the base substrate and without damaging the conductivity of the displacement electrodes, and
   wherein the deformation and displacement of the deformable portion are detected as a variation in capacitance between the electrodes, and the variation in capacitance is detectable in a deformation amount that is greater than or equal to 1 mm.

2. The dynamic quantity detecting member according to claim 1,
   wherein the plurality of electrodes partitioned so as to divide positions of the base substrate are each disposed along with the wiring independent from the electrode, and
   wherein a difference in the position at which the contact object presses the base substrate is distinguished by using the division as a unit.

3. The dynamic quantity detecting member according to claim 1, wherein at least one of the electrodes is disposed at the position facing the displacement electrode.

4. The dynamic quantity detecting member according to claim 1, wherein a material of the displacement electrode is a carbon nanotube.

5. The dynamic quantity detecting member according to claim 1, wherein a degree of variation in a distance between the electrodes caused by the pressing of the contact object is 1 mm or more.

6. The dynamic quantity detecting member according to claim 1, wherein a material of the base substrate is an elastomer.

7. The dynamic quantity detecting member according to claim 6, wherein a material of the base substrate is a porous elastomer.

8. The dynamic quantity detecting member according to claim 6, wherein a material of the base substrate is a material of which a constant of spring is 0.1 N/mm or less.

9. The dynamic quantity detecting member according to claim 6, wherein a carbon nanotube is added with a mass ratio of 0.05 or less to the base substrate.

10. The dynamic quantity detecting member according to claim 1, wherein the dynamic quantity detecting member has a shape to be gripped in one hand for operation.

11. The dynamic quantity detecting member according to claim 1, wherein the base substrate has a structure in which an airtight container formed of a flexible material is filled with a gas, a liquid, or a gel-like solid.

12. The dynamic quantity detecting member according to claim 1, wherein a relative transitivity of the base substrate occupying a space between the electrodes is 1.1 or more.

13. A dynamic quantity detecting apparatus comprising:
    the dynamic quantity detecting member including a base substrate of which a part or the whole including a contact portion is deformed in accordance with pressing of a contact object and of which an original shape is recovered when the pressing of the contact object disappears;
    electrodes serving as displacement electrodes of which the plurality of electrodes are fixed to a surface or inside of the base substrate and of which at least one electrode is disposed in a deformable portion which is a region deformable and displaceable during the deformation of the base substrate;

wirings which are connected to the electrodes;

wherein during the deformation, the displacement electrodes are deformed and displaced with the deformation and displacement of the deformable portion without separating from the base substrate and without damaging the conductivity of the displacement electrodes;

wherein the deformation and displacement of the deformable portion are detected as a variation in capacitance between the electrodes; and a detecting circuit unit which is electrically connected to the electrode via the wiring and detects, as an electric signal, a variation in the capacitance between the electrodes caused by the pressing of the contact objected, and the variation in capacitance is detectable in a deformation amount that is greater than or equal to 1 mm.

14. The dynamic quantity detecting apparatus according to claim 13, wherein when the dynamic quantity detecting apparatus is used along with another electronic apparatus, the dynamic quantity detecting apparatus is configured as an input apparatus outputting an electric signal corresponding to a strength of the pressing of the contact object to the another electronic apparatus.

15. The dynamic quantity detecting apparatus according to claim 13, wherein a material of the displacement electrode is a carbon nanotube.

16. The dynamic quantity detecting member according to claim 1, wherein the deformation and displacement of the deformable portion are detected as a variation in capacitance between the electrodes, and the variation in capacitance is detectable in a deformation range from 1 to 10 mm.

* * * * *